US008787330B2

United States Patent
Goel et al.

(10) Patent No.: US 8,787,330 B2
(45) Date of Patent: Jul. 22, 2014

(54) DENSE MESH NETWORK COMMUNICATIONS

(75) Inventors: Sandesh Goel, Kalyani Nagar (IN); Ashish Kumar Shukla, Yerwada (IN)

(73) Assignee: Marvell World Trade Ltd. (BB)

( * ) Notice: Subject to any disclaimer, the term of this patent is extended or adjusted under 35 U.S.C. 154(b) by 643 days.

(21) Appl. No.: 12/477,751

(22) Filed: Jun. 3, 2009

(65) Prior Publication Data

US 2009/0310516 A1   Dec. 17, 2009

Related U.S. Application Data

(60) Provisional application No. 61/060,587, filed on Jun. 11, 2008.

(51) Int. Cl.
*H04W 4/00* (2009.01)
*H04W 74/08* (2009.01)
*H04W 28/02* (2009.01)
*H04L 12/56* (2006.01)

(52) U.S. Cl.
CPC ...... *H04W 74/0808* (2013.01); *H04W 28/0294* (2013.01); *H04L 47/12* (2013.01)
USPC ........... 370/338; 370/332; 370/328; 370/334; 455/434; 455/521

(58) Field of Classification Search
CPC ..... H04L 47/10–47/12; H04L 47/122–47/127; H04L 47/14; H04W 28/0284–28/046
USPC ......... 370/254, 222, 400, 337–338, 332–334, 370/328; 455/67.11, 440, 434, 521.1
See application file for complete search history.

(56) References Cited

U.S. PATENT DOCUMENTS

| | | | | |
|---|---|---|---|---|
| 7,016,320 | B1 * | 3/2006 | Petersson et al. | 370/331 |
| 7,626,966 | B1 * | 12/2009 | Ruiter et al. | 370/337 |
| 7,639,656 | B2 * | 12/2009 | Dooley et al. | 370/338 |
| 7,969,913 | B2 * | 6/2011 | Park et al. | 370/338 |
| 2006/0077985 | A1 * | 4/2006 | Erwin et al. | 370/400 |
| 2006/0193274 | A1 * | 8/2006 | Yamagata | 370/310 |
| 2007/0019541 | A1 * | 1/2007 | Fujii et al. | 370/222 |
| 2008/0013469 | A1 * | 1/2008 | Eves | 370/310 |
| 2008/0063106 | A1 * | 3/2008 | Hahm et al. | 375/267 |
| 2008/0085712 | A1 * | 4/2008 | Han | 455/440 |
| 2008/0139125 | A1 * | 6/2008 | Son et al. | 455/67.11 |
| 2008/0225717 | A1 * | 9/2008 | Chen et al. | 370/235 |
| 2009/0147725 | A1 * | 6/2009 | Shin et al. | 370/315 |

FOREIGN PATENT DOCUMENTS

JP    2008005201 A  *  1/2008

OTHER PUBLICATIONS

Romaszko, S.; Blondia, C.; , "(NIAMac) Neighbor and Interference—Aware MAC Protocol for Wireless Ad Hoc Networks," Mobile and Wireless Communications Summit, 2007. 16th IST , pp. 1-5, Jul. 1-5, 2007.*

(Continued)

*Primary Examiner* — Charles C Jiang
*Assistant Examiner* — Mohamed Kamara

(57) ABSTRACT

A frame groupcast system for a mesh node in a mesh network having a plurality of mesh nodes includes a transceiver that receives a groupcast frame and a groupcast determination module that determines whether to forward the received groupcast frame based on at least one measurement.

10 Claims, 7 Drawing Sheets

(56) References Cited

OTHER PUBLICATIONS 802.11h™; "IEEE Standard for Information technology—Telecommunications and information exchange between systems—Local and metropolitan area networks—Specific requirements Part 11: Wireless LAN Medium Access Control (MAC) and Physical Layer (PHY) specifications; Amendment 5: Spectrum and Transmit Power Management Extensions in the 5 GHz band in Europe"; IEEE Computer Society; Oct. 14, 2003; 75 pgs.

Syed Aon Mujtaba, Agere Systems; "IEEE P802.11 Wireless LANs"; doc.: IEEE802.11-04/0889r6; May 2005; 131 pgs.

802.16™; "IEEE Standard for Local and metropolitan area networks Part 16: Air Interface for Fixed Broadband Wireless Access Systems"; IEEE Computer Society and the IEEE Microwave Theory and Techniques Society; Apr. 8, 2002; 349 pgs.

802.16a™; "IEEE Standard for Local and metropolitan area networks Part 16: Air Interface for Fixed Broadband Wireless Access Systems—Amendment 2: Medium Access Control Modifications and Additional Physical Layer Specifications for 2-11GHz"; IEEE Computer Spciety and the IEEE Microwave Theory and Techniques society; Apr. 1, 2003, 319 pgs.

"ITU Model for Indoor Attenuation"—Wikipedia, the free encyclopedia; The model—Calculation of distance power loss coefficient; Sep. 16, 2008; 2 pgs.

IEEE Std. 802.11a-1999; "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHZ Band"; The Institute of Electrical and Electronics Engineers, Inc.; Dec. 30, 1999; 91 pgs.

"Draft 802.20 Permanent Document <System Requirements for IEEE 802.20 Mobile Broadband Wireless Systems—Version 14>"; IEEE P 802.20™ V14; Jul. 16, 2004; 24 pgs.

International Standard; ISO/IEC 8802-11; ANSI/IEEE Std 802.11, First edition 1999-00-00; Information technology—Telecommunications and information exchange between systems—Local and metropolitan area networks—Specific requirements—Part 11: Wireless LAN Medium Access Control (MAC) and Physical Layer (PHY) specifications; Std 802.11, 1999 edition; Aug. 20, 1999; 531 pgs.

802.16e™; "IEEE Standard for Local and metropolitan area networks Part 16: Air Interface for Fixed Broadband Wireless Access Systems—Amendment 2: Physical and Medium Access Control Layers for Combined Fixed and Mobile Operation in Licensed Bands and Corrigendum 1"; IEEE Computer Society and the IEEE Microwave Theory and Techniques Society; Feb. 28, 2006; 863 pgs.

802.16™; "IEEE Standard for Local and metropolitan area networks Part 16: Air Interface for Fixed Broadband Wireless Access Systems"; IEEE Computer Society and the IEEE Microwave Theory and Techniques Society; Oct. 1, 2004; 892 pgs.

IEEE Std. 802.11b-1999/Corrigendum 1-2001; "IEEE Standard for Information technology—Telecommunications and information exchange between systems—Local and metropolitan area networks—Specific requirements—Part 11: Wireless LAN Medium Access Control (MAC) and Physical Layer (PHY) specification—Amendment 2: Higher-speed Physical layer (PHY) extension in the 2.4 GHz band—Corrigendum 1"; IEEE Computer Society; Nov. 7, 2001; 23 pgs.

IEEE P802.11g/D8.2 DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; Apr. 2003 IEEE; 69 pgs.

"Path Discovery Mechanism:Sanity"—From OLPC; http://wiki.laptop.org/go/Path_Discovery_Mechanism:Sanity; Sep. 16, 2008; 11 pgs.

* cited by examiner

DENSE MESH NETWORK COMMUNICATIONS

RELATED APPLICATION

The present application claims the benefit under 35 USC 119(e) of U.S. Provisional Application No. 61/060,587, filed on Jun. 11, 2008, the contents of which are incorporated herein by reference in its entirety.

BACKGROUND

1. Technical Field

The present disclosure relates generally to mesh networks and, more particularly, to improving or optimizing communications among nodes of a mesh network.

2. Related Art

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In recent years, the use of wireless mesh networks has increased in order to improve the range of wireless communications while reducing power consumption. Wireless mesh networks typically include a plurality of wireless mesh nodes that communicate with one another to route data. For example, in wireless multi-hop mesh networks, data is propagated from a source mesh node, or an originating mesh node, to a destination mesh node by "hopping" from one mesh node to another until the data reaches the destination mesh node. As such, each mesh node within a wireless mesh network operates as both a receiver and transmitter to communicate data between intervening mesh nodes within a given route. A wireless mesh network having a substantial number of mesh nodes within range (i.e., geographic proximity enabling the effective communication of data) of each other is known as a "dense" wireless mesh network.

A mesh node may periodically groupcast a request frame, such as a probe request, to a group of other mesh nodes (peer nodes) within the mesh network. By groupcasting the group-addressed request frame, the mesh node may be broadcast or multicast to a select group of mesh nodes. The probe request typically triggers a response, such as a probe response, from each neighboring node (i.e., peer node within range). In other words, each mesh node within the network that "hears" the probe request will generate and transmit a probe response. Generally, each mesh node that receives the groupcast frame typically retransmits the groupcast frame in order to relay the frame to peer nodes out of range.

Consequently in dense wireless mesh networks having a substantial number of mesh nodes within range of each other, several neighboring nodes may simultaneously generate and transmit a response frame based on a single request frame. Furthermore, as noted above, each of these neighboring nodes typically retransmit the received request frame which, particularly in dense wireless mesh networks, results in redundant request frames being received by each of the neighboring nodes.

As a result, the performance of dense wireless mesh networks suffers due to collisions occurring among the numerous response frames and collisions between retransmission attempts as well as due to the inefficient use of network resources based on redundant transmissions.

BRIEF SUMMARY

The present invention is defined by the following claims, and nothing in this section should be taken as a limitation on those claims.

By way of introduction, the embodiments below provide a frame groupcast system for a mesh node in a mesh network having a plurality of mesh nodes that includes a transceiver that receives a groupcast frame and a groupcast determination module that determines whether to forward the received groupcast frame based on at least one measurement.

A computer-readable storage medium that stores a computer program includes instructions for causing a processor to receive a groupcast frame and determine whether to groupcast the received groupcast frame based on at least one measurement.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

The embodiments will now be described with reference to the attached drawings.

DETAILED DESCRIPTION

Figure 1:
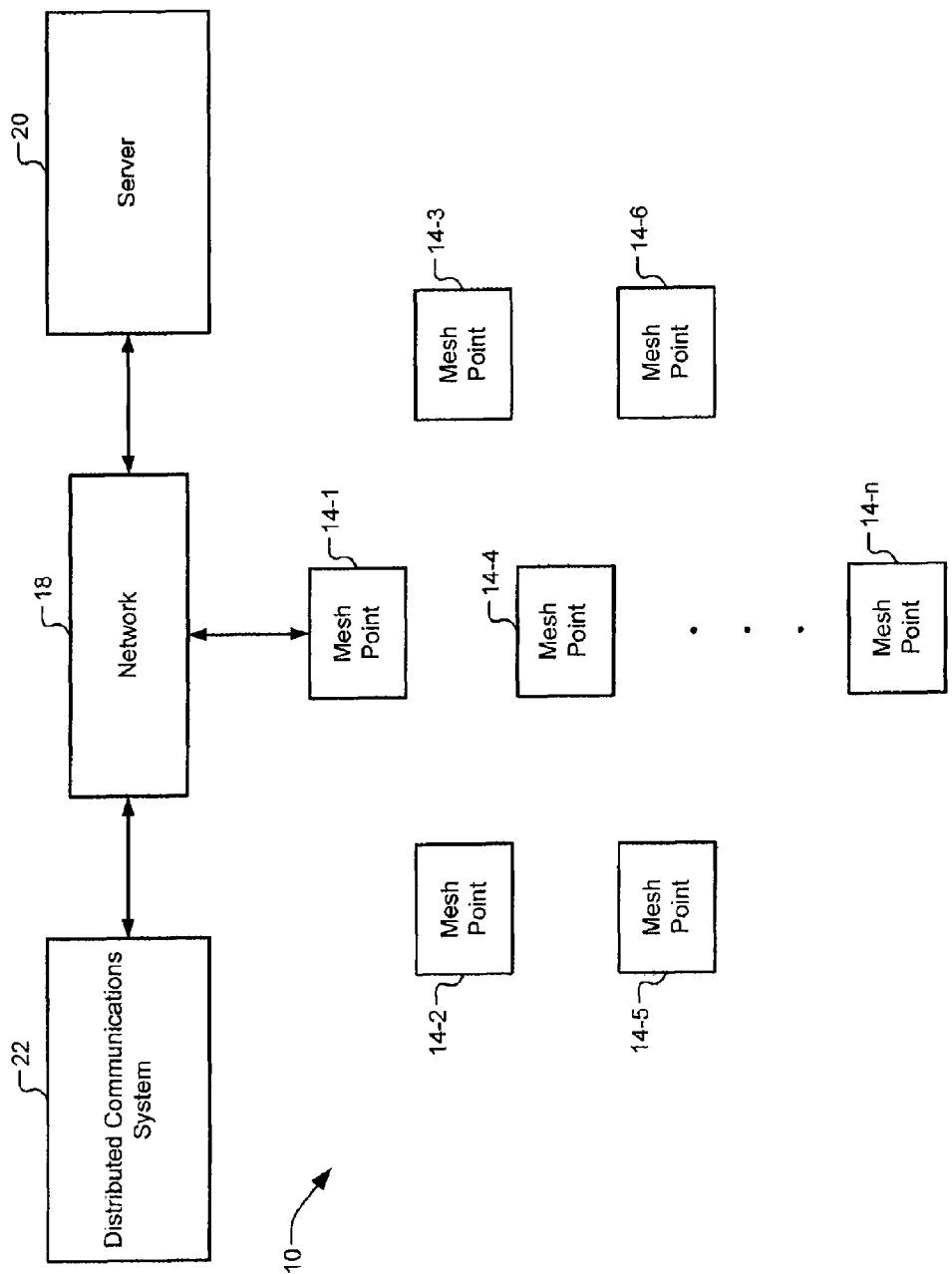
FIG. 1 is a functional block diagram of an exemplary wireless mesh network according to the present disclosure.

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views. The following description is merely exemplary in nature and is in no way intended to limit the disclosure, its application, or uses. As used herein, the term module refers to an Application Specific Integrated Circuit (ASIC), an electronic circuit, memory and a processor (shared, dedicated, or group) that execute one or more software or firmware programs in the memory, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

By way of introduction, the embodiments described herein are related to wireless mesh networks that include wireless mesh network devices such as mesh points and mesh portals, commonly referred to as mesh nodes. A plurality of mesh nodes may communicate with one another (i.e., pass information) via a plurality of wireless links that operate to interconnect the plurality of the mesh nodes thereby forming a wireless mesh network. A wireless mesh network having a substantial number of mesh nodes within range of each other (i.e., neighboring nodes) is known as a "dense" wireless mesh network.

Each mesh node is capable of communicating with peer nodes (i.e., other mesh nodes within a given network) positioned within range (e.g., geographic proximity of the transmitting node that enables information to be passed) of the transmitting peer node. Peer nodes within range of each other are commonly referred to as neighboring nodes. In other words, the range of communication of a given peer node may enable effective communication with certain neighboring nodes within a wireless mesh network while not enabling communication with other peer nodes with the same wireless mesh network. As mentioned above, in dense mesh networks, several peer nodes are within communication range of each other (i.e., dense mesh networks include a substantial number of neighboring nodes).

In order to discover neighboring nodes within range and their respective functional capabilities, each node within a given wireless mesh network may periodically groupcast (i.e., broadcast or multicast) a request frame, such as a probe request. Neighboring nodes among the peer nodes of the wireless mesh network generate a probe response (i.e., a response frame) based on the probe request. As such, in conventional dense mesh networks having a substantial number of nodes within range, each neighboring node generates and transmits a response frame at approximately the same time based on a single request frame. The near simultaneous generation of response frames results in data congestion (i.e., interference) caused by collisions of various response frames and/or retransmission attempts of response frames which, in turn, degrades the overall dense mesh network performance.

In an effort to minimize interference, conventional mesh networks often stagger (i.e., delay) the transmission of respective response frames by a "backoff" period in an attempt to reduce the likelihood that various neighboring nodes will attempt to transmit their respective response frames simultaneously. According to the 802.11 standard, each peer node may attempt to transmit information over a wireless communication channel when the channel has been available (i.e., clear of transmissions) for a period defined as a backoff window.

Conventionally, backoff windows have been determined based on a predetermined, default parameter known as a contention widow which is commonly utilized for each peer node within the wireless mesh network. A contention window (CW) defines the minimum and maximum length of the backoff window (i.e., the backoff time). Typically, contention windows include a uniform distribution of numbers ranging from a minimum CW value to a maximum CW value. Each peer node contending for access to the communication channel typically will generate a backoff time based on the product of a number randomly selected from the contention window with a standard defined slot-time. The peer node then remains idle (i.e., does not attempt to transmit a probe response over the channel) for the length of time equal to the backoff time. Although default contention windows may avoid data congestion in some wireless mesh networks, default contention windows fail to adequately reduce the likelihood of response collisions in dense mesh networks.

The present disclosure describes wireless mesh networks having mesh nodes which employ transmission improvement or optimization operations and are merely exemplary in nature. Each mesh node includes a transceiver circuit (e.g., a RF transceiver) and/or a system-on-chip circuit (SOC) that perform(s) optimization operations on data transmissions sent to peer nodes operating within a common wireless mesh network. More particularly, the present disclosure describes an optimization system that improves the utilization of a wireless transmission medium, thereby increasing the overall performance of wireless mesh network. As one example discussed in more detail below, the present disclosure describes a mesh node that includes the capability of determining a maximum contention window (such as based on the numbers of neighboring mesh nodes detected within the mesh network). This determination of the maximum contention window allows for a substantial reduction in the probability of collisions occurring between responses and/or retransmission attempts transmitted by neighboring nodes within the wireless mesh network. As another example, again discussed in more detail below, the present disclosure describes a mesh node that includes the capability to determine whether to forward a received groupcast frame. This determination may be based on one or more measurements (such as a measurement indicative of path loss or a measurement of the distance from the mesh node to other mesh nodes in the mesh network). This determination whether to forward the received groupcast frame may reduce the redundant broadcasts or multicasts from the mesh nodes in the mesh network, thereby improving the performance of dense wireless mesh networks.

Referring now to FIG. 1, an exemplary wireless mesh network 10 is shown. Wireless communications of the wireless mesh network 10 may be compliant with various protocols including at least one of the Institute of Electrical and Electronics Engineers (IEEE) standards 802.11, 802.11a, 802.11b, 802.11g, 802.11h, 802.11k, 802.11n, 802.16, 802.16a, 802.16e, 802.16-2004, and 802.20, and/or the Bluetooth standard published by the Bluetooth Special Interest Group (SIG). The aforementioned standards are hereby incorporated by reference in their entirety.

The wireless mesh network 10 includes a plurality of mesh nodes 14-1, 14-2 . . . and 14-*n*, referred to collectively as the mesh nodes 14. In the present implementation, the mesh network 10 depicts a dense wireless mesh network that includes a substantial number of mesh nodes (e.g., eight or more mesh nodes) that are within communication range of each other. Those skilled in the art will appreciate that the dense mesh network 10 may include a variable number of mesh nodes. Each of the mesh nodes 14 may communicate with one another via wireless mesh links (not shown) over a wireless communication medium (e.g., over-the-air). In other words, each mesh node 14 within the mesh network 10 serves as both a receiver and transmitter to communicate data between the mesh nodes 14.

The mesh network 10 may include one or more mesh nodes 14 (e.g., 14-1) that provide a connection to a wired network (e.g., network 18) and are commonly referred to as mesh portals. Mesh portals provide a gateway enabling data to be relayed between the mesh nodes 14 and various wired devices (not shown) of the network 18. Users of various wireless devices (not shown) within the mesh network 10 may communicate with one another via the mesh nodes 14. The wireless devices may include, but are not limited to, a desktop computer, a personal digital assistant (PDA), a mobile phone, a laptop, a personal computer (PC), a printer, a digital camera, an internet protocol (IP) phone. The network 18 may be a local area network (LAN), a wide area network (WAN), or another network configuration. The network 18 may include other nodes such as a server 20 and may be connected to a distributed communications system 22 such as the Internet.

Figure 2:
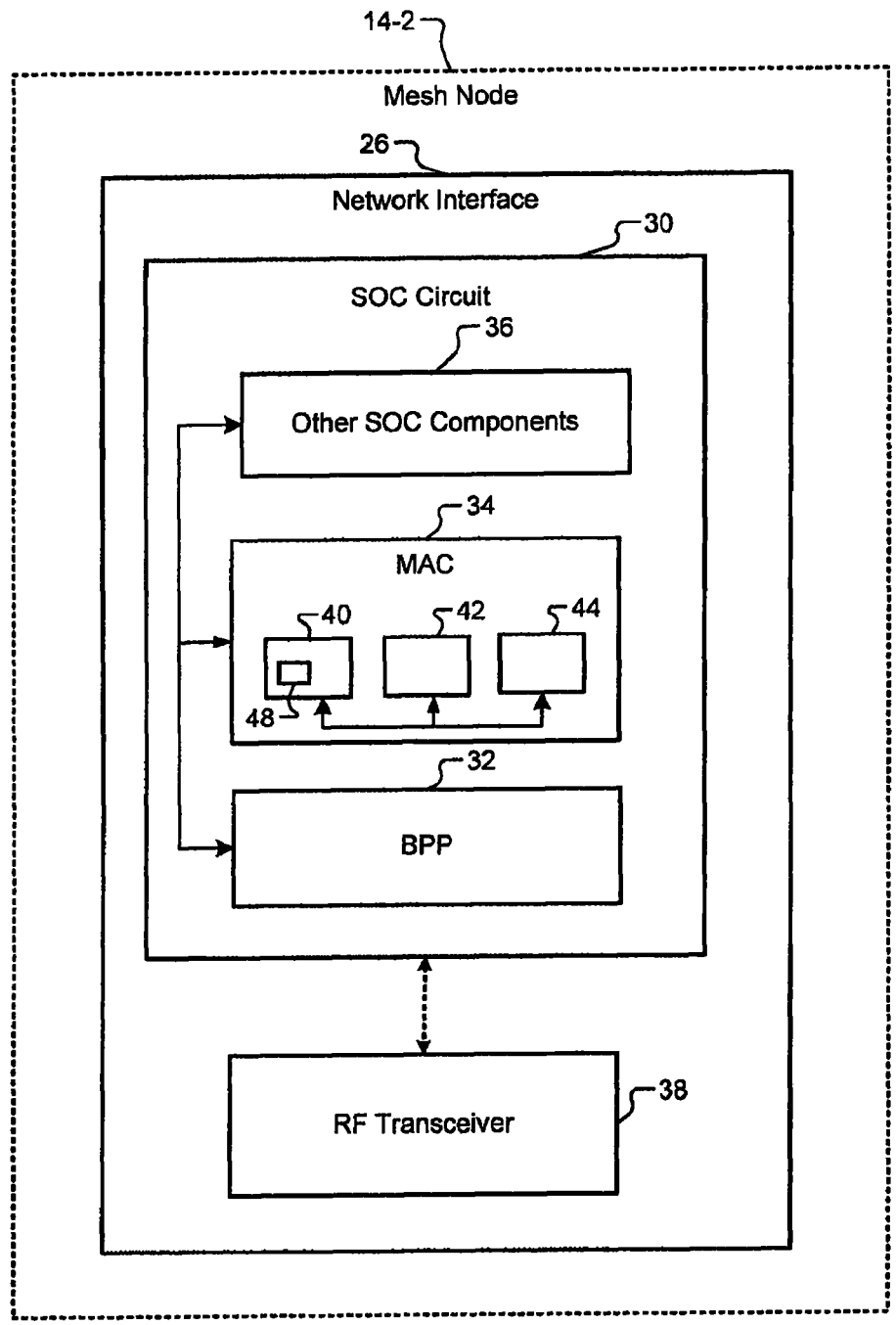
FIG. 2 is a functional block diagram of an exemplary mesh node including a network interface according to the present disclosure.

Referring now to FIG. 2, an exemplary mesh node 14-2 is shown in more detail. For the sake of simplicity and brevity, the present disclosure will discuss the operation of the optimization system with reference to the functions performed by the exemplary mesh node 14-2, though those skilled in the art will appreciate that each of the other mesh nodes 14 may implement the optimization system of the present disclosure in similar fashion.

The mesh node 14-2 is shown to include a network interface 26. A SOC circuit 30 of the network interface 26 includes a baseband processor (BBP) 32, a media access control (MAC) device 34, and other SOC components, identified collectively at 36, such as interfaces, firmware, memory, and/or other processors. A radio frequency (RF) transceiver 38 along with the BBP 32 communicates with the MAC device 34. BBP 32 processes signals received from and/or transmitted to the RF transceiver 38. The RF transceiver 38 modulates signals received from the BBP 32 and demodulates signals prior to transmitting the signals to the BBP 32. Additionally the RF transceiver 38 transmits/receives frames (e.g., a probe request or a probe response) to/from various other mesh nodes 14 in the exemplary mesh network 10. Each of the mesh nodes 14 may transmit streams having various types of frames and/or structures.

In the present implementation, the MAC device 34 is configured to execute MAC layer operations such as supervising and maintaining communications between the mesh node 14-2 and the other mesh nodes 14. More specifically, the MAC layer may perform operations including, but not limited, scanning the mesh network 10 to discover neighboring nodes within range and their respective functionalities. In the present implementation, each of the mesh nodes 14 may constitute a neighboring node (i.e., each of the mesh nodes 14 may be within communication range of one another) given the dense wireless mesh network topology of the mesh network 10.

As mentioned above, a mesh node within a wireless mesh network periodically groupcasts a frame within its wireless network that elicits a response frame from all peer nodes within range. For example, the mesh node 14-2 may groupcast a route request frame throughout the mesh network 10 and, in response, receive route reply frames from each mesh node 14 within the mesh network 10 that provides a respective route to a destination node. The mesh node 14-2 may then select an optimal route for forwarding data to the particular destination node based on processing information within each respective route reply frame. Although the present example utilizes a route request frame, those skilled in the art will appreciate that the present disclosure may be applied to any class of groupcasted frame (i.e., broadcasted or multicasted frame) that initiates a response frame from neighboring nodes. The transmission of route reply frames (i.e., response frames), specifically the determination of contention access for a given mesh node 14, will be discussed in further detail below.

In the present implementation, the MAC device 34 includes a node discovery module 40, a contention window (CW) determination module 42, and a groupcast determination module 44. The node discovery module 40, the CW determination module 42, and the groupcast determination module 44 selectively communicate with the BBP 32 and the other SOC components 36, as well as the RF transceiver 38. The CW determination module 42 in combination with the node discovery module 40 performs contention window optimization operations in accordance with the present disclosure in order to improve the management of transmissions on a common communication channel shared among the mesh nodes 14.

The node discovery module 40 processes incoming response frames received by the RF transceiver 38 based on an associated request frame previously groupcasted throughout the mesh network 10. The node discovery module 40 then determines the number of neighboring nodes 14 (i.e., the mesh nodes 14 within range of the mesh node 14-2) within the mesh network 10. In the dense mesh network topology of the present embodiment, each of the mesh nodes 14 may be within range of one another and therefore may all constitute neighboring nodes.

As mentioned above, the mesh node 14-2 may operate to select an optimal route for forwarding data to a particular destination node within the mesh network 10 based on processing information within route reply frames received from neighboring mesh node 14 within range. However, multiple routes to various destination nodes within the mesh network 10 may originate at the mesh node 14-2. The node discovery module 40 may operate to periodically refresh all active routes that originate at the mesh node 14-2 using a single, common timer module 48. Upon the expiration of a refresh time defined by the timer module 48, the node discovery module 40 refreshes all active routes originating at the mesh node 14-2 based on the transmission of a single route request frame. In the present implementation, the route request frame includes information related to all the endpoints (i.e., the destination nodes) associated with the routes originating at the mesh node 14-2. In response to receiving the route request frame, each destination node then generates a respective route reply frame received by the mesh node 14-2. Each route reply frame includes information indicative of the optimal route to a respective destination node within the mesh network 10.

In some embodiments, the node discovery module 40 may selectively enable the optimization operations discussed herein based on the "path loss" (i.e., signal power attenuation) associated with transmissions between the mesh node 14-2 and each of the other mesh nodes 14. In the present implementation, the node discovery module 40 maintains a record of the number of the other mesh nodes 14 within the mesh network 10 that are associated with a path loss value below a path loss threshold. When the number of mesh nodes 14 exceeds a peer count threshold indicative of dense mesh environment, the optimization operations are enabled. The peer count threshold may be modified by a user/operator of the mesh network 10.

As previously discussed, a contention window sets the minimum and maximum length of wait time (i.e., backoff time) observed by a mesh node (e.g., a mesh node 14) prior to attempting to transmit data over a wireless communication channel. The CW determination module 42 adaptively generates a maximum contention window value based on a metric associated with the mesh network 10 at a given point in time. For example, in the present implementation, the CW determination module 42 generates a maximum contention window value based the number of neighboring nodes 14 detected, or discovered, by the node discovery module 40 at a given point in time. In other words, each of the mesh nodes 14, in real-time, independently computes a respective maximum contention window based on data received through communications with the other mesh nodes 14 within the mesh network 10, thereby significantly reducing the likelihood of interference caused by frame collisions.

Those skilled in the art will appreciate that each mesh node 14 may execute several iterations of the contention window optimization operation described above in order to validate the generated contention window. Additionally, the present disclosure contemplates performing contention window optimization operations periodically and/or based upon a determination that a respective mesh node 14 has requested permission to transmit over the communication channel.

Figure 3:
FIG. 3 depicts a table of exemplary computed maximum contention window values according to the present disclosure.

Referring now to FIGS. 2 and 3, an exemplary contention window optimization operation as performed by the CW determination module 42 is discussed in more detail. FIG. 3 depicts a table 50 of computed values of maximum contention windows respectively based on the numbers of neighboring mesh nodes 14 detected within the mesh network 10. The computation of an exemplary contention window according to the present disclosure will be discussed with reference to row 3 of the table 50. In the present implementation, in order to generate the maximum contention window, the CW determination module 42 first computes a product of the n neighboring mesh nodes 14 discovered by the node discovery module 40 with a predetermined scaling factor s as follows: Product=n*s.

In the present example, the node discovery module 40 determines that 20 neighboring nodes exist within the mesh network 10. The CW determination module 42 thus generates a product value of "80" based on a scaling factor of "4". Those skilled in the art will appreciate that the scaling factor may include a plurality of values.

In the present implementation, the CW determination module 42 proceeds to determine the maximum contention window value based on the lowest exponential value x of a base value b that exceeds the product value as follows:

$$\text{Product} < b^x$$

where the variable $b^x$ equals the maximum value of the adaptive contention window for n neighboring nodes. Utilizing a base-2 value in the present example in which the product value equals "80", the CW determination module 42 generates a maximum contention window of 27 or 128 timeslots which equates to approximately a 1 millisecond (ms) time delay. In other words, the randomly generated back-off time for the particular mesh node 14 in the present example may equal a value between 0 ms and approximately 128 ms. The table 50 further illustrates exemplary maximum contention window values based on the detection of 10, 15, and 25 neighboring nodes utilizing the scaling factor and base value of the present example.

By implementing the contention window optimization operation of the present disclosure, each mesh node 14 of the mesh network 10 can dynamically compute an optimal maximum contention window value based on data characterizing the mesh network 10 at a given point in time, thereby reducing the likelihood of collisions among transmissions propagated over the communication medium and thus improving the performance of the mesh network 10.

Data congestion in wireless mesh networks may further result from traffic caused by redundant broadcasts or multicasts. In conventional wireless mesh networks, neighboring nodes that receive, for example, a broadcast or multicast frame typically forward, the frame to peer nodes positioned out-of-range of the initial broadcast or multicast. However, as discussed above, in a dense wireless mesh network, several peer nodes are within broadcast or multicast range of one another and therefore constitute neighboring nodes that receive an initial broadcast or multicast from a transmitting mesh node. In other words, each neighboring node within a conventional dense wireless mesh network receives multiple transmissions of the identical frame due to broadcast or multicast forwarding operations, thereby negatively impacting the overall performance of the wireless network.

Figure 4:
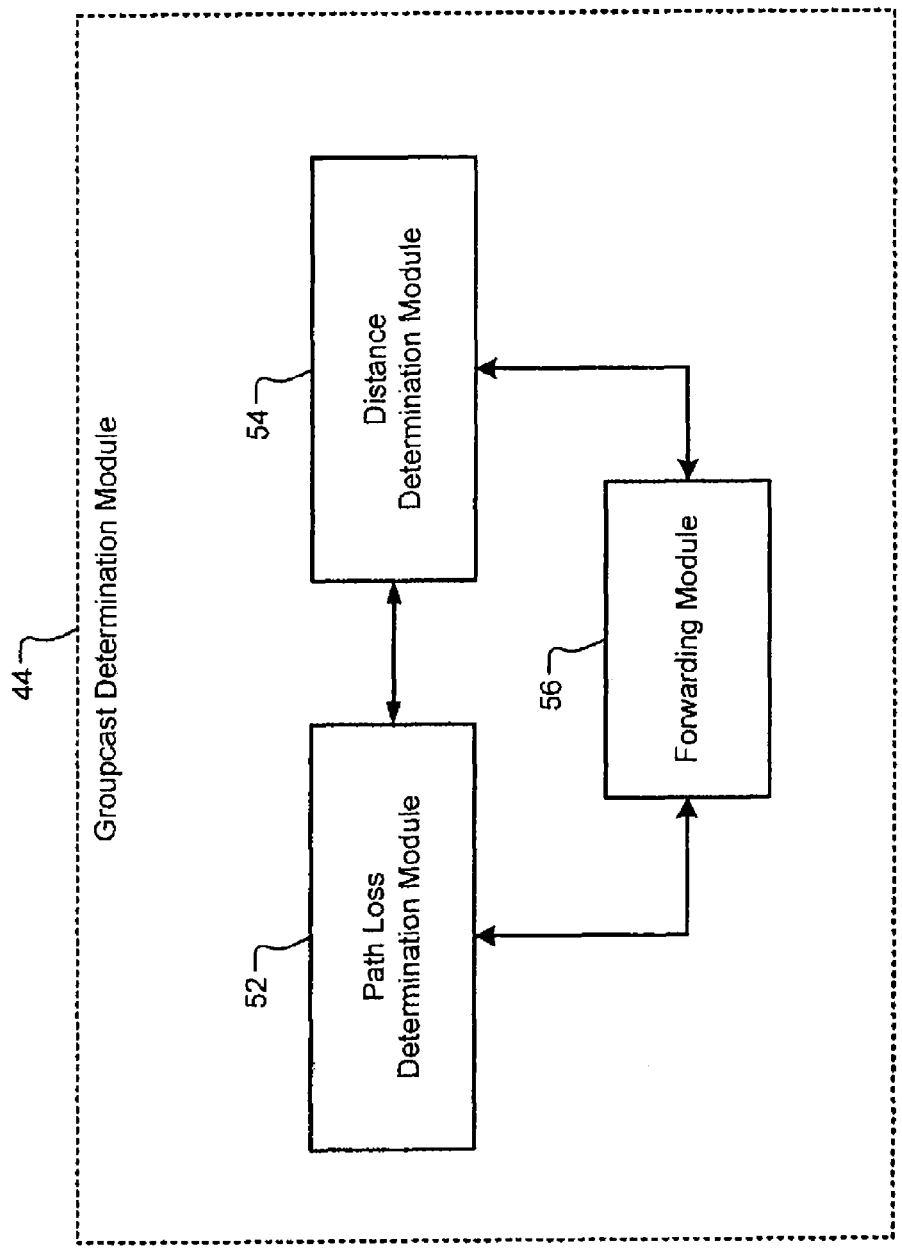
FIG. 4 is a functional block diagram of an exemplary groupcast determination module according to the present disclosure.

Referring now to FIGS. 2 and 4, the groupcast determination module 44 will be discussed in more detail. The groupcast determination module 44 performs groupcast forwarding optimization operations in accordance with the present disclosure in order to minimize the number of duplicative, or redundant, transmissions received among mesh nodes 14 within the mesh network 10. Specifically, the groupcast determination module 44 of a given mesh node 14 makes a determination of whether to forward or retransmit a received groupcast frame.

FIG. 4 depicts the groupcast determination module 44 in more detail. The groupcast determination module 44 includes a path loss determination module 52, a distance determination module 54 and a forwarding module 56. The path loss determination module 52, the distance determination module 54 and the forwarding module 56 each selectively communicate with the BBP 32, the other SOC components 36, as well as the RF transceiver 38. The path loss determination module 52 evaluates the "path loss" of signals transmitted between the mesh node 14-2 and each of the other respective mesh nodes 14 in the mesh network 10. The path loss of a signal equates to the reduction in strength the signal (signal power attenuation) experiences as the signal propagates through a medium to a receiving node. Factors contributing to the path loss of a signal can include, but are not limited to, the distance between a transmitter of the signal and a receiver, free-space loss, and/or characteristic of the propagation medium. A received groupcast frame may include information reflecting the transmission power (transmission power data) utilized by the transmitting device to transmit the groupcast frame. In some embodiments, the path loss determination module 52 may compute the path loss of the received frame based on transmission power information in combination with the evaluated signal strength of a received frame at the mesh node 14-2. Alternatively, the path loss determination module 52 may employ a class of management frames known as link measurement frames to actively monitor path loss between the mesh node 14-2 and the other peer nodes 14.

The path loss determination module 52 periodically reevaluates the path loss between the mesh node 14-2 and each of the peer nodes 14 in order to account for environmental changes, namely positional changes of the mesh nodes 14 within the mesh network 10. During periods between evaluations of the respective path losses, the path loss determination module 52 utilizes a reference received signal strength indication (RSSI) value associated with each peer node 14 in order to maintain accurate path loss values. The path loss determination module 52 proceeds to modify each RSSI value based on RSSI variations detected from frames received from respective peer nodes 14. The path loss determination module 52 stores the current path loss value associated with each peer node 14.

Upon determining a current path loss value associated with a received frame, the path loss determination module 52 transmits the current path loss value to the forwarding module 56. The forwarding module 56 compares the current path loss value to a path loss threshold. If the current path loss value meets or exceeds the path loss threshold, the forwarding module 56 forwards, or retransmits, the received frame. However, if the path loss threshold exceeds the current path loss value, the forwarding module 56 does not retransmit the received frame. In other words, if the path loss threshold exceeds the current path loss value, the forwarding module 56 determines that there exists a likelihood that another mesh node 14 within the wireless network has already received (i.e., has heard) the original groupcast of the frame and therefore determines that there is no need to further retransmit or forward the frame. In the present implementation, the path loss threshold may be modified by a user/operator of the mesh network 10.

As mentioned above, the groupcast determination module 44 further includes a distance determination module 54 that communicates with the path loss determination module 52 and the forwarding module 56. The distance determination module 54 respectively computes an approximate distance between the mesh node 14-2 and each of the other mesh nodes 14 in the mesh network 10 based on an associated path loss.

A number of standard path loss models exist based on the particular mesh network deployment scenario that may be used to approximate the distance based on path loss. For example, in the present implementation, the distance determination module 54 computes the distance to each of the other peer nodes 14 from the mesh node 14-2 based on the International Telecommunication Union (ITU) indoor path loss model as follows:

$$L = 20 \log(F) + N^* \log(D) - 28,$$

where the variable L represents the path loss value in decibels (dB), the variable N represents an environment dependent constant, the variable F represents a frequency in megahertz (MHz), and the variable D represents the distance in meters from the transmitting node. For the sake of simplicity, the present disclosure will evaluate the path loss model in a typical office environment at a frequency of 2.4 GHz. In such environments, the practical path loss may range from 40 to 100 dB. Based on these operating conditions, the ITU indoor path loss model may be simplified to $L = 40 + 30 \log(D)$. If the path loss value (L) is known, the distance determination module 54 computes the distance D as follows:

$$D = 10^{(L-40)/30}.$$

Using the exemplary values mentioned above, the computed distance typically varies from approximately 1 to 100 meters for office environment applications.

Upon computing the approximate distance of each of the peer nodes 14, the distance determination module 54 determines which distance measurement has the largest value. In other words, the distance determination module 54 determines which one of the peer nodes 14 within the mesh network 10 is farthest from the mesh node 14-2. The distance determination module 54 then transmits the sum of the largest distance measurement and the distance between itself and the transmitter of the received groupcast frame value to the forwarding module 56. The forwarding module 56 compares the sum value to a distance threshold. The distance threshold represents the maximum range that a transmission may be accurately heard within the mesh network 10. Those skilled in the art will appreciate that the maximum distance, or range, that a transmission may be received is based on the physical layer (PHY) transmission rate used during the transmission. For each PHY rate employed, the maximum distance may be computed based on the sensitivity of the receiving node in accordance with 802.11 specifications for the particular PHY rate.

If the sum value meets or exceeds the distance threshold, the forwarding module 56 retransmits the received groupcast frame. However, if the distance threshold exceeds the sum value, the forwarding module 56 does not retransmit the received groupcast frame. In other words, the forwarding module 56 operates on the assumption that if the peer node 14 positioned farthest in relation to the mesh node 14-2 receives the originally groupcast frame, then the other peer nodes 14 (i.e., peer nodes positioned in closer proximity to the peer device 14-2 than the farthest peer node) also received the originally groupcast frame.

Figure 5A:
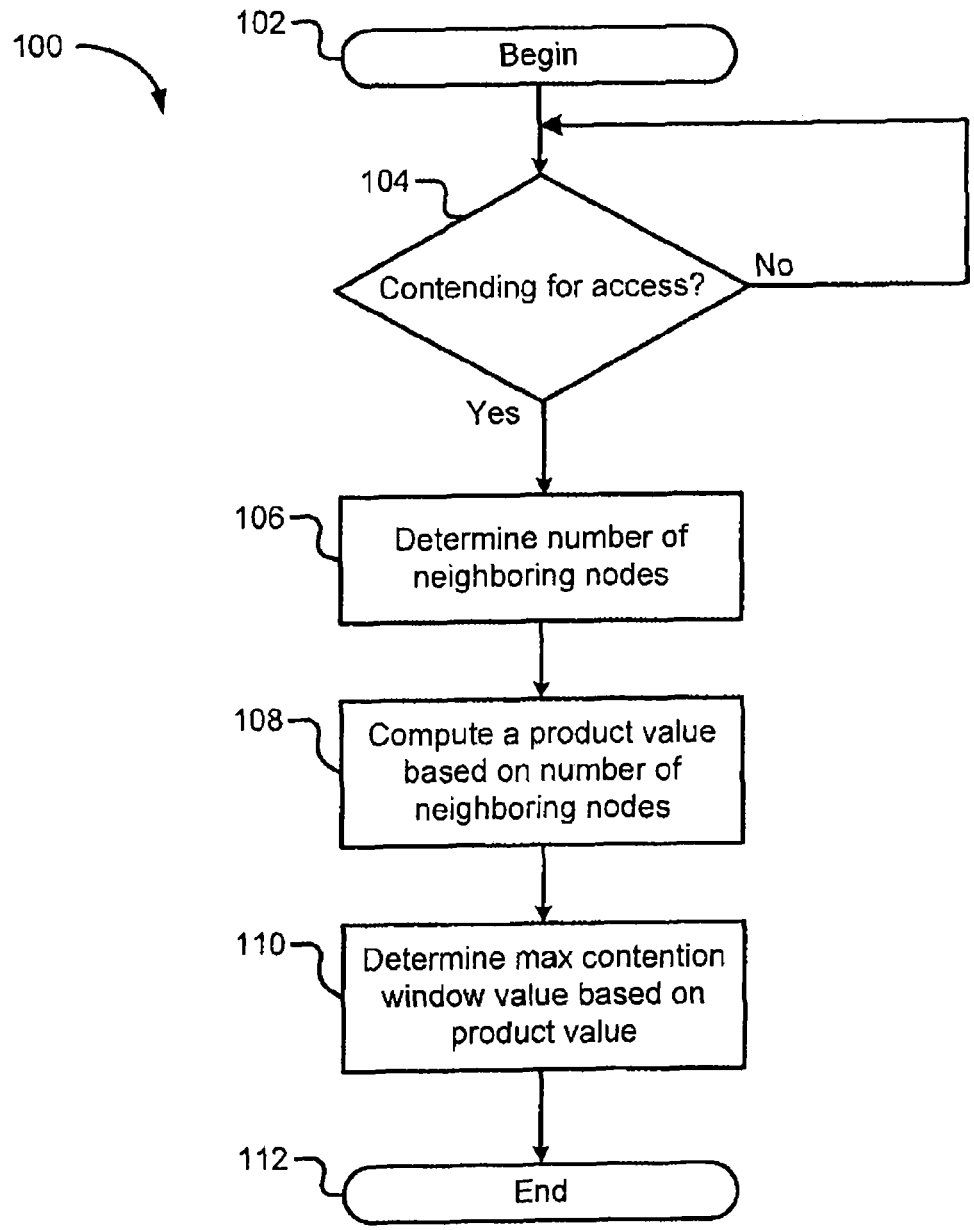
FIG. 5(a) is a flow diagram illustrating steps of an exemplary contention window optimization operation according to the present disclosure.

Referring to FIG. 5(a), a method 100 of performing a contention window optimization operation is shown in more detail. The method 100 begins at step 102. In step 104, the MAC device 34 of the exemplary mesh node 14-2 determines whether the mesh node 14-2 is contending for access to the communication medium. If the MAC device 34 determines that the mesh node 14-2 is not contending for access, the method 100 returns to step 104. If the MAC device 34 determines that the mesh node 14-2 is contending for access to the communication medium, the method proceeds to step 106.

In step 106, the node discovery module 40 determines the number of neighboring nodes 14 within the mesh network 10 based on incoming response frames. In step 108, the CW determination module 42 computes a product value based on the number of neighboring nodes 14 and a predetermined scaling factor. In step 110, the CW determination module 42 determines a maximum contention window value based on the lowest exponential value of a base value that exceeds the product value. In step 112, the method 100 ends.

Figure 5B:
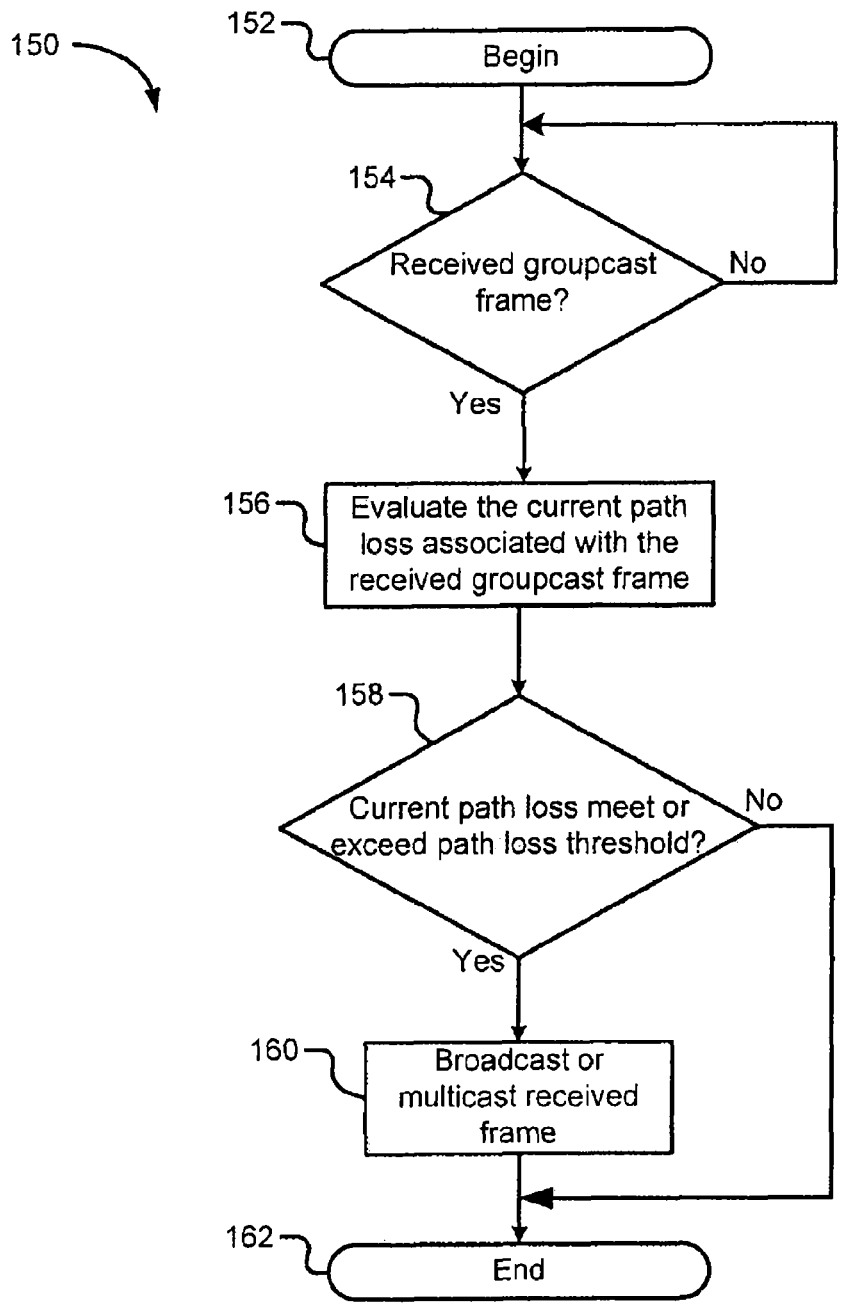
FIG. 5(b) is a flow diagram illustrating steps of an exemplary groupcast forwarding optimization operation according to the present disclosure.

Referring to FIG. 5(b), a method 150 of performing a groupcast forwarding optimization operation is shown in more detail. The method 150 begins at step 152. In step 154, the MAC device 34 of the exemplary mesh node 14-2 determines whether the mesh node 14-2 has received a groupcast frame. If the MAC device 34 determines that the mesh node 14-2 has not received a frame, the method 150 returns to step 154. If the MAC device 34 determines that the mesh node 14-2 has received a frame, the method proceeds to step 156.

In step 156, the path loss determination module 52 evaluates the current path loss of the received fame. In step 158, the forwarding module 56 determines whether the current path loss meets or exceeds the path loss threshold. If the forwarding module 56 determines that the current path loss value meets or exceeds the path loss threshold, the method 150 proceeds to step 160. If the forwarding module 56 determines that the current path loss value does not exceed the path loss threshold, the method 150 proceeds to step 162. In step 160, the forwarding module 56 groupcasts the received frame within the mesh network 10. In step 162, the method 150 ends.

Figure 5C:
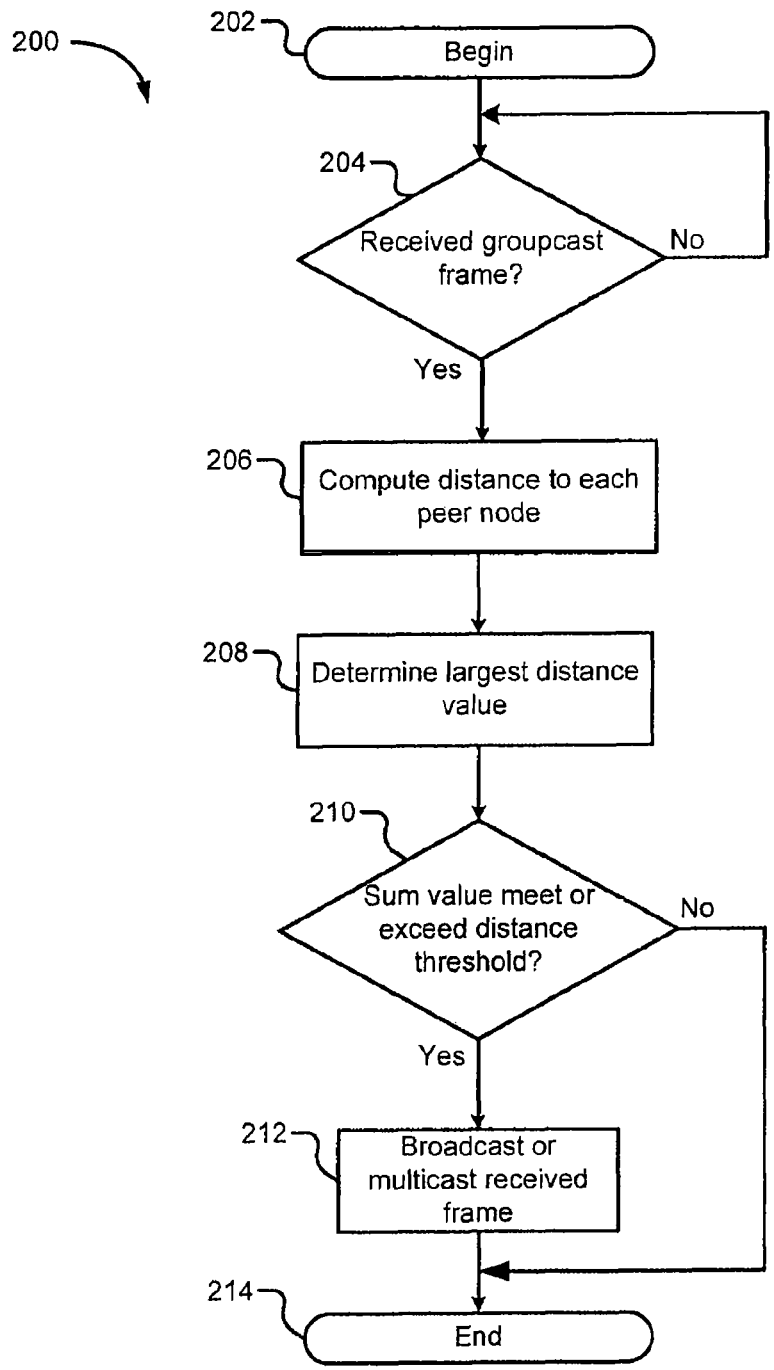
FIG. 5(c) is a flow diagram illustrating steps of another exemplary broadcast forwarding optimization operation according to the present disclosure.

Referring to FIG. 5(c), a method 200 of performing another implementation of the groupcast forwarding optimization operation is shown in more detail. The method 200 begins at step 202. In step 204, the MAC device 34 of the exemplary mesh node 14-2 determines whether the mesh node 14-2 has received a groupcast frame. If the MAC device 34 determines that the mesh node 14-2 has not received a frame, the method 200 returns to step 204. If the MAC device 34 determines that the mesh node 14-2 has received a frame, the method proceeds to step 206.

In step 206, the distance determination module 54 computes the distance from the mesh node 14-2 to each peer node 14 within the mesh network 10. In step 208, the distance determination module 54 determines which computed distance value has the largest value. In step 210, the forwarding module 56 compares a value of the sum of the largest computed distance value and the distance between the farthest peer node 14 and the transmitter of the received frame with distance threshold. If the forwarding module 56 determines that the sum value meets or exceeds the distance threshold, the method 200 proceeds to step 212. If the forwarding module 56 determines that the sum value does not meet or exceed the distance threshold, the method 200 proceeds to step 214. In step 212, the forwarding module 56 retransmits the received frame within the mesh network 10. In step 214, the method 200 ends.

All of the discussion above, regardless of the particular implementation being described, is exemplary in nature, rather than limiting. Although specific components of the optimization system are described, methods, systems, and articles of manufacture consistent with the optimization system may include additional or different components. For example, components of the optimization system may be implemented by one or more of: control logic, hardware, a microprocessor, microcontroller, application specific integrated circuit (ASIC), discrete logic, or a combination of circuits and/or logic. Further, although selected aspects, features, or components of the implementations are depicted as hardware or software, all or part of the systems and methods consistent with the optimization system may be stored on, distributed across, or read from machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, Flash or any other type of memory. Programs may be parts of a single program, separate programs, or distributed across several memories and processors.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the invention can take and not as a definition of the invention. It is only the following claims, including all equivalents, that are intended to define the scope of this invention.

What is claimed is:

1. A frame groupcast system for a mesh node in a mesh network having a plurality of mesh nodes, the frame groupcast system comprising:
   a transceiver configured to receive a groupcast frame from a first peer node of a plurality of peer nodes in the mesh network; and
   a groupcast determination processor configured to:
      determine a distance between the mesh node and the first peer node;
      determine a value that is based at least in part on the determined distance between the mesh node and the first peer node;
      compare the value with a distance threshold, the distance threshold indicative of a likelihood that another mesh node in the mesh network received the groupcast frame from the first peer node;
      in response to the comparison resulting in the value exceeding the distance threshold, forward the received groupcast frame to a second peer node of the plurality of peer nodes; and
      in response to the comparison resulting in the value being less than the distance threshold, not forward the received groupcast frame to the second peer node,
      wherein the second peer node is different than the first peer node.

2. The system of claim 1 wherein the determined distance is based on at least one of signal power attenuation associated with the first peer node or path loss associated with the first peer node.

3. The system of claim 1 wherein the first peer node is a transmitting peer node that transmitted the groupcast frame to the mesh node.

4. The system of claim 2 wherein the path loss is measured based on at least one of transmission power data within the received groupcast frame, a measurement of signal strength of the received groupcast frame determined at the mesh node, or processing link measurement frames.

5. The system of claim 3 wherein the groupcast determination module processor is further configured to:
   determine a plurality of distances, each of the plurality of distances is a distance between the mesh node and one of the plurality of peer nodes;
   determine a largest distance of the plurality of distances; and
   determine the value further based on the largest distance.

6. The system of claim 5 wherein the groupcast determination processor is further configured to:
   determine the value as a sum value comprising a sum of the largest distance and the determined distance between the mesh node and the transmitting peer node; and
   forward the received groupcast frame in response to the sum value meeting or exceeding the distance threshold.

7. A frame groupcast method for a mesh node in a mesh network having a plurality of mesh nodes, the method comprising:
   receiving a groupcast frame from a first peer node of a plurality of peer nodes in the mesh network;
   determining a distance between the mesh node and the first peer node;
   determining a value that is based at least in part on the determined distance between the mesh node and the first peer node;
   comparing the value with a distance threshold, the distance threshold indicative of a likelihood that another mesh node in the mesh network received the groupcast frame from the first peer node;
   in response to the comparison resulting in the value exceeding the distance threshold, forwarding the received groupcast frame to at least one second peer node of the plurality of peer nodes; and
   in response to the comparison resulting in the value being less than the distance threshold, not forwarding the received groupcast frame to the at least one second peer node,
   wherein the at least one second peer node is different than the first peer node.

8. The method of claim 7 wherein the determined distance is based on at least one of signal power attenuation associated with the first peer node or path loss associated with the first peer node.

9. The method of claim 7 wherein the first peer node comprises a transmitting peer node that transmitted the received groupcast frame to the mesh mode, the method further comprising:
- determining a plurality of distances, each of the plurality of distances is a distance between the mesh node and one of the plurality of peer nodes;
- determining a largest distance of the plurality of distances; and
- determining the value further based on the largest distance.

10. The method of claim 9 further comprising:
- determining the value as a sum value comprising a sum of the largest distance and the determined distance between the mesh node and the transmitting peer node,
- wherein forwarding the received groupcast frame comprises forwarding the received groupcast frame to the at least one second peer node in response to the comparison resulting in the sum value exceeding the distance threshold; and
- wherein not forwarding the received groupcast frame comprises not forwarding the received groupcast frame to the at least one second peer node in response to the comparison resulting the sum value being less than the distance threshold.

* * * * *